(12) United States Patent
Hedouin et al.

(10) Patent No.: US 6,475,452 B1
(45) Date of Patent: Nov. 5, 2002

(54) COMPOSITION BASED ON MANGANESE AND USE FOR TRAPPING NOX FOR TREATING EXHAUST GASES

(75) Inventors: Catherine Hedouin, Gouvieux (FR); Thierry Seguelong, Puteaux (FR); Arno Fritz, Paris (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/554,825

(22) PCT Filed: Nov. 23, 1998

(86) PCT No.: PCT/FR98/02496

§ 371 (c)(1), (2), (4) Date: Aug. 9, 2000

(87) PCT Pub. No.: WO99/26715

PCT Pub. Date: Jun. 3, 1999

(30) Foreign Application Priority Data

Nov. 25, 1997 (FR) .............................. 97 14771

(51) Int. Cl.$^7$ .......................... B01D 53/54; B01D 53/60
(52) U.S. Cl. ................................ 423/213.2; 423/239.1; 502/304
(58) Field of Search .............................. 423/212, 213.2, 423/239.1; 502/302, 304, 324, 349

(56) References Cited

U.S. PATENT DOCUMENTS

| 5,185,311 A | * | 2/1993 | Tabata et al. ................ 502/304 |
| 5,362,463 A | * | 11/1994 | Stiles et al. ............... 423/239.1 |
| 5,976,476 A | * | 11/1999 | Blanchard et al. ....... 423/213.2 |

FOREIGN PATENT DOCUMENTS

| WO | WO 96 21506 | 7/1996 | ............ B01J/23/83 |
| WO | WO 97 10892 | 3/1997 | ........... B01D/53/94 |

* cited by examiner

*Primary Examiner*—Wayne A. Langel
*Assistant Examiner*—Maribel Medina

(57) ABSTRACT

The invention relates to compositions of the NOx trap type. According to a first embodiment, the composition comprises a supported phase containing manganese and at least one other element selected from terbium, gadolinium, europium, samarium, neodymium and praseodymium and a support based on cerium oxide or a mixture of cerium oxide and zirconium oxide. According to a second embodiment, the composition comprises a supported phase and a support of the same type as for the first embodiment, and is characterized in that the manganese and the potassium are supplied by potassium permanganate. According to another embodiment, the composition consists essentially of manganese and of cerium oxide. These compositions can be used in a gas treatment process with a view to reducing nitrogen oxide emissions.

7 Claims, No Drawings

COMPOSITION BASED ON MANGANESE AND USE FOR TRAPPING NOX FOR TREATING EXHAUST GASES

This application is an application under 35 U.S.C. Section 371 of International Application Number. PCT/FR98/02496 filed on Nov. 23, 1998.

The present invention relates to a manganese-based composition and to its use for exhaust gas treatment.

It is known that the nitrogen oxide (NOx) emissions in exhaust gases from motor vehicles are reduced, in particular, with the aid of three-way catalysts, which stoichiometrically use the reducing gases present in the mixture. Any oxygen excess leads to a pronounced deterioration in the catalyst's performance.

However, certain engines, for example, diesel engines or lean-burn petrol engines, save on fuel but emit exhaust gases which permanently contain a large oxygen excess, of for example at least 5%. A standard three-way catalyst is therefore ineffective for the NOx emissions in this case. Furthermore, it has become imperative to limit NOx emissions owing to the tightening of motor vehicle emission standards which have now have been extended to these engines.

There is therefore a genuine need for an efficient catalyst to reduce NOx emissions for these types of engines and, generally, for treating gases containing NOx.

As a type of catalyst which can meet this need, systems referred to as NOx traps have been proposed which are capable of oxidizing NO into $NO_2$ and then of absorbing the $NO_2$ thus formed. Under certain conditions, the $NO_2$ is re-released then reduced to $N_2$ by reducing species contained in the exhaust gas. These NOx traps are generally based on platinum. However, platinum is an expensive element. It would therefore be beneficial to provide a platinum-free system in order to reduce the costs of the catalysts.

The object of the invention is therefore to develop a catalyst which can be used as an NOx trap without necessarily using platinum.

To this end, and according to a first embodiment of the invention, the composition according to the invention comprises manganese, cerium oxide or a mixture of cerium oxide and zirconium oxide, and is characterized in that it furthermore contains at least one other element selected from terbium, gadolinium, europium, samarium, neodymium and praseodymium.

According to a second embodiment, the composition according to the invention comprises manganese and potassium, and cerium oxide or a mixture of cerium oxide and zirconium oxide, and is characterized in that it can be obtained by a process in which at least one of the two elements manganese and potassium is supplied at least partially by potassium permanganate.

The invention furthermore relates to a process for treating gases with a view to reducing nitrogen oxide emissions by trapping the said oxides, characterized in that a composition consisting essentially of manganese and of cerium oxide is used.

Lastly, the invention relates to a process of the same type which uses the compositions according to the aforementioned two embodiments.

Other characteristics, details and advantages of the invention will become yet more fully apparent on reading the following description, as well as the various concrete but non-limiting examples intended to illustrate it.

The composition of the invention is characterized by the nature of the elements which form it and which have been mentioned above. It will be noted here that, in this composition, the cerium oxide or the mixture of cerium oxide and zirconium oxide may form a support, the other elements forming a supported phase. This means that the cerium oxide or the mixture of cerium oxide and zirconium oxide may form the majority element or elements of the composition, on which element or elements the other elements are deposited. For simplicity, the rest of the description will refer to support and supported phase, but it will be understood that, if an element described as belonging to the supported phase were to be present in the support, for example by being introduced therein during the actual preparation of the support, this would not depart from the scope of the present invention.

In the scope of the first embodiment mentioned above, the composition may comprise a supported phase which is based on manganese in combination with terbium, gadolinium, samarium, neodinium or praseodimium, or alternatively a mixture of manganese and at least two of these elements. According to a variant of this first embodiment, the composition may further comprise an alkali metal which may more particularly be sodium or potassium. This alkali metal element may belong to the supported phase.

In the second embodiment, the composition may comprise a supported phase which is based on manganese in combination with potassium. Furthermore, at least one of the two elements manganese and potassium is supplied at least partially by potassium permanganate during the process of preparing the composition. It should be noted that a single element may be supplied by the permanganate, and only partially. Conversely, and preferentially, it is also possible to supply the two elements fully by the permanganate route. All of the variants between these two possibilities may be envisaged. This embodiment makes it possible to obtain compositions having high NOx adsorption capacities.

The amounts of elements in the supported phase of the composition can vary in wide proportions. The minimum proportion is that below which NOx adsorption activity is no longer observed. The manganese proportions may thus vary between 2 and 50%, more particularly between 5 and 30%. The terbium, gadolinium, samarium, neodinium, praseodymium and/or potassium proportions may vary between 1 and 50%, more particularly between 5 and 30%. These proportions are expressed as atomic % with respect to the sum of the support and the elements relevant to the supported phase.

It is to be pointed out here, and for the description as a whole, that the manganese and the other elements are present in oxide form in the compositions described.

Supports based on cerium oxide or a mixture of cerium oxide and zirconium oxide are well known. Mention may more particularly be made, as regards mixtures of cerium oxide and zirconium oxide, of those described in patent applications EP-A-605274 and EP-A-735984, the teaching of which is incorporated here. Use may more particularly be Made of supports based on cerium and zirconium oxides in which these oxides are present in a cerium/zirconium atomic proportion of at least 1. As regards these same supports, those which are in the form of a solid solution may also be used. In this case, the X-ray diffraction spectra of the support reveal the existence of a single homogeneous phase within it. As regards supports which are richer in cerium, this-phase actually corresponds to that of a crystallized cubic cerium oxide $CeO_2$ whose lattice parameters are shifted to a greater or lesser extent relative to a pure cerium oxide, thus reflecting the incorporation of zirconium in the crystal lattice of the cerium oxide, and therefore the fact that a genuine solid solution is obtained.

According to a variant of the invention, supports are used which are characterized by their specific surface at certain temperatures, as well as their oxygen storage capacity.

The term specific surface is intended to mean the BET specific surface determined by nitrogen adsorption according to the standard ASTM D 3663-78 established on the basis of the Brunauer—Emmett—Teller method described in the periodical "The Journal of the American Society, 60, 309 (1938)".

It is thus possible to use supports which are based on a cerium oxide and a zirconium oxide in a cerium/zirconium atomic proportion of at least 1 and which have a specific surface after calcining for 6 hours at 900° C. of at least 35 $m^2/g$. Another characteristic of the supports of this variant is their oxygen storage capacity. This capacity, measured at 400° C., is at least 1.5 ml $O_2/g$. It may more particularly be at least 1.8 ml $O_2/g$. This capacity is determined by a test which evaluates the capacity of the support, or of the product, to successively oxidize amounts of carbon monoxide injected with oxygen and to consume injected amounts of oxygen to reoxidize the product. The method employed is referred to as an alternative method.

The carrier gas is pure helium at a flow rate of 10 l/h. The injections are carried out by means of a loop containing 16 ml of gas. The amounts of CO are injected using a gas mixture containing 5% CO diluted in helium, while the amounts of $O_2$ are injected by employing a gas mixture containing 2.5% $O_2$ diluted in helium. The gases are analysed by chromatography using a thermal conductivity detector.

The amount of oxygen consumed makes it possible to determine the oxygen storage capacity. The characteristic value of the oxygen storage power is expressed in ml of oxygen (under standard temperature and pressure conditions) per gram of product introduced, and is measured at 400° C. The measurements of oxygen storage capacity given here, and in the rest of the description, are taken from products pretreated at 900° C. under air for 6 hours in a muffle furnace.

In the case of the above-described variant employing supports defined by their specific surface and their oxygen storage capacity, the support may be obtained by a process in which a mixture is prepared in a liquid medium containing a cerium compound and a zirconium solution, which is such that the amount of base needed to reach the equivalence point during an acid-base titration of this solution satisfies the molar ratio condition $OH^-/Zr \leq 1.65$; the said mixture is heated; the precipitated obtained is recovered and this precipitate is calcined.

This process will now be described more specifically.

The first step of this process consists in preparing a mixture in a liquid medium, generally in the aqueous phase, containing at least one cerium compound and one zirconium compound. This mixture is prepared by using a zirconium solution.

This zirconium solution may be produced by acid attack on a reagent containing zirconium. Examples of suitable reagents include zirconium carbonate, hydroxide or oxide. The attack may be carried out using an inorganic acid such as nitric acid, hydrochloric acid or sulphuric acid. Nitric acid is the preferred acid, and the use of a zirconyl nitrate produced by nitric attack on a zirconium carbonate may thus most particularly be mentioned. The acid may also be an organic acid such as acetic acid or citric acid.

This zirconium solution must have the following characteristic. The amount of base needed to reach the equivalence point during an acid-base titration of this solution must satisfy the molar ratio condition $OH^-/Zr \leq 1.65$. Most particularly, this ratio may be at most 1.5, or yet more particularly, at most 1.3. In general, the specific surface of the product obtained tends to increase as this ratio decreases.

The acid-base titration is carried out in a way that is known. In order to carry it out under optimum conditions, a solution may be titrated which has been adjusted to a concentration of about $3.10^{-2}$ mol per liter, expressed in terms of the element zirconium. Whilst stirring, a 1N sodium hydroxide solution is added to it. Under these conditions, the determination of the equivalence point (change of the pH of the solution) takes place cleanly. This equivalence point is expressed by the $OH^-/ZR$ molar ratio.

Particular examples of cerium compounds which may be mentioned include cerium salts such as cerium(IV) salts, such as nitrates or ammonium ceric nitrates for example, which are particularly suitable here. Ceric nitrate is preferably used. The solution of cerium(IV) salts may contain cerium in the cerus state, but it is preferable for it to contain at least 85% of cerium(IV). An aqueous solution of ceric nitrate may, for example, be obtained by reacting nitric acid with a hydrated ceric oxide prepared conventionally by reacting a solution of a cerus salt, for example cerus nitrate, with an ammonia solution in the presence of hydrogen peroxide. It is also possible to use a ceric nitrate solution which is obtained according to the process involving electrolytic oxidation of a cerus nitrate solution, as described in the document FR-A-2 570 087, and which may constitute an advantageous starting material.

It will be noted here that the aqueous solution of cerium (IV) salts may have some degree of initial free acidity, for example a normality varying between 0.1 and 4 N. According to the present invention, it is equally possible to employ an initial solution of cerium(IV) salts actually having some degree of free acidity, as mentioned above, as well as a solution which has been neutralized beforehand, more or less powerfully, by adding a base such as, for example, an ammonia solution or alkaline metal (sodium, potassium, etc.) hydroxides, but preferably an ammonia solution, so as to limit this acidity. It is then possible, in the latter case, practically to define a degree of neutralization (r) for the initial cerium solution by the following equation:

$$r = \frac{n3 - n2}{n1}$$

in which n1 represents the total number of moles of Ce(IV) present in the solution after neutralization; n2 represents the number of moles of $OH^-$ ions actually needed to neutralize the initial free acidity contributed by the aqueous solution of cerium(IV) salt; and n3 represents the total number of moles of $OH^-$ ions contributed by the addition of the base. When the "neutralization" variant is employed, the amount of base used will in all cases be necessarily less than the amount of base needed to obtain full precipitation of the hydroxide species $Ce(OH)_4$ (r=4). In practice, this will involve a limitation to degrees of neutralization of no more than 1, and more preferably no more than 0.5.

The amount of cerium and zirconium present in the mixture must correspond to the stoichiometric proportions required for obtaining a support with the desired final composition.

Once the initial mixture has been obtained in this way, it is then heated, according to the second step of the process in question.

The temperature at which this heat treatment, also referred to as thermohydrolysis, is carried out may be between 80° C.

and the critical temperature of the reaction medium, in particular between 80 and 350° C., preferably between 90 and 200° C.

Depending on the temperature conditions adopted, this treatment may be carried out either under normal atmospheric pressure or under a pressure such as, for example, the saturated vapour pressure corresponding to the temperature of the heat treatment. When the treatment temperature is chosen to be above the reflux temperature of the reaction medium (i.e. generally above 100° C.), for example chosen between 150 and 350° C., the operation is then carried out by introducing the aqueous mixture containing the aforementioned species into a sealed enclosure (closed reactor more commonly referred to as an autoclave), in which case the required pressure results merely from the heating of the reaction medium (autogenous pressure). Under the temperature conditions given above, and in an aqueous medium, it may thus be indicated by way of illustration that the pressure in the closed reactor varies between a value in excess of 1 bar ($10^5$ Pa) and 165 bar ($165.10^5$ Pa), preferably between 5 bar ($5.10^5$ Pa) and 165 bar ($165.10^5$ Pa). It is of course also possible to exert an external pressure, which is then added to that due to the heating.

The heating may be carried out either under an air atmosphere or under an inert gas atmosphere, preferably nitrogen.

The treatment time is not critical, and may thus vary within wide limits, for example between 1 and 48 hours, preferably between 2 and 24 hours.

At the end of the heating step, a solid precipitate is recovered which can be separated from its medium by any conventional solid/liquid separation technique, for example filtration, settling, drying or centrifuging.

It may be advantageous to introduce a base, for example an ammonia solution, into the precipitation medium after the heating step. This makes it possible to increase the yields with which the precipitated species is recovered.

It is also possible to add hydrogen peroxide in the same way, after the heating step.

The product, as recovered, may then be washed with water and/or aqueous ammonia, at a temperature between room temperature and the boiling point. In order to remove the residual water, the washed product may lastly, if appropriate, be dried for example in air, this being done at a temperature which may vary between 80 and 300° C., preferably between 100 and 150° C., the drying being continued until a constant weight is obtained.

It will be noted that it is, of course, possible for a heating step as described above to be repeated one or more times, identically or differently, after recovery of the product and optional addition of the base or hydrogen peroxide, in which case the product is returned to a liquid medium, in particular in water, and for example heat treatment cycles are carried out.

In a last step of the process, the recovered precipitate is then calcined, after optional washing and/or drying. According to a particular embodiment, after the thermohydrolysis treatment and optionally after returning the product to a liquid medium and an additional treatment, it is possible to dry the reaction medium obtained directly by spraying.

The calcining is carried out at a temperature of generally between 200 and 1200° C., and preferably between 300 and 900° C. This calcining temperature must be sufficient to convert the precursors into oxides, and is also chosen on the basis of the future working temperature of the support and while taking into account the fact that the specific surface of the product becomes commensurably lower as the calcining temperature employed increases. For its part, the calcining time can vary within wide limits, for example between 1 and 24 hours, preferably between 4 and 10 hours. The calcining is generally carried out under air, but calcining carried out, for example, under an inert gas is clearly not to be ruled out.

It will be noted that, in the case of a support based on cerium oxide, it is possible to use a support which, further to cerium oxide, comprises a specific-surface stabilizer which is chosen from the rare earth group. The term rare earth is intended to mean the elements in the group consisting of yttrium and the elements in the periodic table with an atomic number lying between 57 and 71 inclusive. The rare earth may more particularly be praseodymium, terbium or lanthanum. It should be noted that it is thus possible to have a composition according to the invention which comprises a rare earth both in the supported phase and in the support.

In the process for preparing the compositions of the invention comprising a support and a supported phase, the supported phase may be deposited on the support in a known way. The procedure used may involve an impregnation method. A solution or slip of salts or compounds of the elements in the supported phase will thus firstly be formed.

Examples of salts which may be chosen include salts of inorganic acids, such as nitrates, sulphates or chlorides.

It is also possible to use salts of organic acids, and in particular salts of saturated aliphatic carboxylic acids or salts of hydroxycarboxylic acids. Examples which may be mentioned include formates, acetates, propionates, oxalates or citrates.

The support is then impregnated with the solution or slip. After impregnation, the support is optionally dried, and is then calcined. It should be noted that it is possible to use a support which has not yet been calcined prior to the impregnation.

Dry impregnation is more particularly used. Dry impregnation consists in adding to the product to be impregnated a volume of an aqueous solution of the element which is equal to the pore volume of the solid to be impregnated.

In the case of the second embodiment described above, potassium permanganate is quite clearly used as the salt of manganese and potassium. If appropriate, the complementary portion of manganese and/or potassium may be supplied by salts of the type described above.

In the case of compositions whose supported phase contains a rare earth, it may be advantageous to deposit the rare earth first, followed by the manganese.

The compositions of the invention, as described above, are in the form of powders but may optionally be shaped to be in the form of granules, balls, cylinders or honeycombs of variable sizes. The compositions may thus be used in catalytic systems comprising a wash coat having catalytic properties and based on these compositions, on a substrate of, for example, the metallic or ceramic monolith type.

The invention also relates to a process for treating gases with a view to reducing nitrogen oxide emissions employing the compositions of the invention. As indicated above, the invention furthermore relates to the use in this treatment of a composition consisting essentially of manganese and cerium oxide. The term "essentially consists" is intended to mean that this composition may have catalytic activity (that is to say, in this case, NOx trapping activity) in the absence of any element other than manganese and cerium oxide. It will be noted that, in the case of using a composition consisting essentially of manganese and cerium oxide, a cerium oxide may form a support with the manganese forming a supported phase.

The gases which can be treated by the present invention are, for example, those output by gas turbines, thermal power station boilers or alternatively internal combustion engines. In the latter case, these may in particular be diesel engines or lean-burn engines.

When they are brought into contact with gases which, have a high level of oxygen, the compositions of the invention function as NOx traps. The term gases having a high level of oxygen is intended to mean gases having an oxygen excess with respect to the amount needed for stoichiometric combustion of the fuels and, more precisely, gases having an oxygen excess with respect to the stoichiometric value $\lambda=1$. The value $\lambda$ is correlated with the air/fuel ratio in a manner which is known per se, in particular in the field of internal combustion engines. Such gases are those from a lean-burn engine which have a level of oxygen (expressed by volume) of at least 2%, as well as those which have an even higher level of oxygen, for example gases from engines of the diesel type, that is to say at of least 5% or more than 5%, more particularly 10%, it being possible for this level to lie between 5 and 20%, for example.

The compositions of the invention may be associated with complementary emission control systems, such as three-way catalysts, which are effective when the value of $\lambda$ is less than or equal to 1 in the gases, or alternatively in systems involving fuel injection or exhaust gas recirculation (EGR) for diesel engines.

The invention also relates to a catalytic system for treating gases with a view to reducing nitrogen oxide emissions, which gases may be of the type mentioned above and, more particularly, those having an oxygen excess relative to the stoichiometric value. This system comprises a composition as described above.

Examples will now be given.

In these examples, the catalytic test is carried out as follows:

0.15 g of the NOx trap in powder form is introduced into a quartz reactor. The powder used has been compacted beforehand and ground and screened so as to isolate the particle size fraction between 0.125 and 0.250 mm.

The reaction medium at the inlet of the reactor has the following composition (by volume):

NO: 300 vpm
$O_2$: 10%
$CO_2$: 10%
$H_2O$: 10%
$N_2$: sufficient quantity for 100%

The overall flow rate is 30 l (stp)/h.

The hourly space velocity is of the order of 150,000 $h^{-1}$.

The NO and NOx (NOx=NO+$NO_2$) signals are recorded continuously, as is the temperature of the reactor.

The NO and NOx signals are given by an Ecophysics NOx analyser based on the chemoluminescence principle.

The evaluation of the NOx traps is in two parts:

Firstly, the temperature of maximum adsorption is determined by adsorbing the NOx at 125° C. for 15 minutes, and by subsequently heating under the same mixture to 600° C. The NOx profile shows an adsorption maximum at a certain temperature.

Secondly, the amount adsorbed isothermally at the temperature of maximum adsorption is determined.

The amount is calculated by integration.

EXAMPLE 1

This example relates to the preparation and use of a catalyst whose supported phase is based on manganese and potassium.

Use is made of potassium permanganate (99.5% $KMnO_4$) and, as support, cerium oxide HSA5® from Rhone-Poulenc, with a pore volume determined with water of 0.4 $cm^3/g$ which is not calcined before deposition of the active element. The levels of Mn and K deposited are equal to 16% respectively ([Mn]/([Mn]+[$CeO_2$])=0.16). The potassium and manganese are deposited by dry impregnation, the support being impregnated with a $KMnO_4$ solution whose volume is equal to the pore volume of the support and whose concentration makes it possible to obtain the desired levels of Mn and K. The impregnated support is then stove dried at 110° C. then is calcined at 750° C. for 2 h with a temperature rise of 5° C./min. Its BET specific surface (BET SS) is equal to 9 $m^2/g$.

EXAMPLES 2 to 7

Starting materials:

Use is made of manganese nitrate $Mn(NO_3)_2$, praseodymium nitrate $Pr(NO_3)_3$, gadolinium nitrate $Gd(NO_3)_3$, samarium nitrate $Sm(NO_3)_3$, neodymium nitrate $Nd(NO_3)_3$ and terbium nitrate $Tb(NO_3)_3$.

The support used is cerium oxide calcined for 2 hours at 500° C.

Levels of the supporting elements:

1st step: Deposition of the 1st supported element.

This consists in depositing the supported element, specifically at 10 atomic % in the case of Gd, Sm, Nd, Pr, Tb with respect to the sum of the numbers of moles of the element and moles of cerium oxide, i.e.:

[X]/([X]+[$CeO_2$])=0.1 with X=Gd, Sm, Nd, Pr, Tb.

2nd step: Deposition of the 2nd supported element.

This consists in depositing the second supported element, specifically at 10 atomic % of Mn with respect to the sum of the numbers of moles of the elements and moles of cerium oxide, i.e.:

[Y]/([X]+[Y]+[$CeO_2$])=0.1 with Y=Mn.

Synthesis routes:

Dry impregnation is used in all cases.

Dry impregnation

This consists in impregnating the support in question with the supported element dissolved in a solution whose volume is equal to the pore volume of the support (determined with water: 0.4 $cm^3/g$) and whose concentration makes it possible to achieve the desired doping.

In the present case, the elements are impregnated on the support one after the other.

The operating protocol is as follows:

dry impregnation of the first element
stove drying(110° C., 2 h)
calcining for 2 h at 500° C. (5° C./min)
dry impregnation of the second element
stove drying (110° C., 2 h)
calcining for 2 h at 500° C. (5° C./min).

Products obtained:

Example 2: [Gd]=10 atomic %, [Mn]=10 atomic %, BET SS=107 $m^2/g$

Example 3: [Sm]=10 atomic %, [Mn]=10 atomic %, BET SS=107 $m^2/g$

Example 4: [Nd]=10 atomic %, [Mn]=10 atomic %, BET

Example 5: [Pr]=10 atomic %, [Mn]=10 atomic %, BET SS=100 $m^2/g$

Example 6: [Tb]=10 atomic %, [Mn]=10 atomic %, BET SS=125 $m^2/g$

Example 7: [Mn]=10 atomic %, BET SS=128 m²/g
For Example 7, a single element (Mn) was deposited.

EXAMPLES 8 to 10

Use is made of the same starting materials and of the same support as in examples 2 to 7 with furthermore sodium nitrate and potassium nitrate.

The procedure for the deposition involves three steps. The first consists in depositing manganese in an amount of 10 atomic % with respect to the sum of the number of moles of manganese and moles of cerium oxide, i.e.:

$$[Mn]/([Mn]+[CeO_2])=0.1$$

In the second step, the second supported element is deposited in an amount of 10 atomic % with respect to the sum of the numbers of moles of the elements and moles of cerium oxide, i.e.:

$$[Y]/([Mn]+[Y]+[CeO_2])=0.1$$

with Y=Pr, Nd

In the third step, the third supported element is deposited in an amount of 5 atomic % with respect to the sum of the numbers of moles of the elements and moles of cerium oxide, i.e.:

$$[Z]/([Mn]+[Y]+[Z]+[CeO_2])=0.05$$

with Z=Na, K Dry impregnation is used as in examples 2 to 7.

Products Obtained

Example 8: [Mn]=10 atomic %, [Nd]=10 atomic %, [K]=5 atomic %; BET SS=91 m²/g

Example 9: [Mn]=10 atomic %, [Pr]=10 atomic %, [K]=5 atomic %; BET SS=92 m²/g

Example 10: [Mn]=10 atomic %, [Pr]=10 atomic %, [Na]=5 atomic %; BET SS=90 m²/g

The results of the catalytic test are given in the following table.

| Example | Amount adsorbed ($10^{-4}$ mole) | Temperature of maximum adsorption (° C.) |
|---|---|---|
| 1 | 13.3 | 370 |
| 2 | 6.1 | 230 |
| 3 | 6.3 | 240 |
| 4 | 6.4 | 240 |
| 5 | 6.3 | 240 |
| 6 | 6.1 | 240 |
| 7 | 7.3 | 225 |
| 8 | 4,3 | 270 |

-continued

| Example | Amount adsorbed ($10^{-4}$ mole) | Temperature of maximum adsorption (° C.) |
|---|---|---|
| 9 | 4,2 | 280 |
| 10 | 4,9 | 270 |

What is claimed is:

1. A process for treating internal combustion engines exhaust gases, having an oxygen excess relative to the stoichiometric value, in order to reduce nitrogen oxide emissions, comprising the step of trapping said oxides with a composition consisting essentially of manganese, cerium oxide or a mixture of cerium oxide and zirconium oxide, at least one other element selected from the group consisting of terbium, gadolinium, europium, samarium, and neodymium, and optionally an alkali metal.

2. A process according to claim 1, wherein the composition consists essentially of manganese, cerium oxide or a mixture of ceriun oxide and zirconium oxide, at least one other element selected from the group consisting of terbium, gadolinium, europium, samarium, and neodymium, and an alkali metal.

3. A process according to claim 1, wherein the cerium oxide or the mixture of cerium oxide and zirconium oxide forms a support, and the manganese and the other elements form a supported phase.

4. A process according to claims 1, wherein the level of oxygen in the gases is at least 5% by volume.

5. A process for treating internal combustion engines exhaust gases, in order to reduce nitrogen oxide emissions, comprising the step of trapping said oxides with a composition consisting essentially of manganese, potassium, ceriun oxide or a mixture of cerium oxide and zirconium oxide, wherein the composition is made by a process wherein at least one of the two elements manganese and potassium is supplied at least partially as potassium permanganate.

6. A process according to claim 5, wherein the gases have an oxygen excess relative to the stoichiometric value.

7. A process for treating internal combustion engines exhaust gases, in order to reduce nitrogen oxide emissions, comprising the step of trapping said oxides with a composition consisting essentially of manganese, cerium oxide or a mixture of cerium oxide and zirconium oxide, praseodymium, and optionally an alkali metal, wherein the gases have an oxygen excess relative to the stoichiometric value.

* * * * *